(12) United States Patent
Chae et al.

(10) Patent No.: US 9,496,929 B2
(45) Date of Patent: Nov. 15, 2016

(54) COORDINATED BEAMFORMING METHOD IN WIRELESS ACCESS SYSTEM, AND APPARATUS THEREFOR

(71) Applicant: LG ELECTRONICS INC., Seoul (KR)

(72) Inventors: Hyukjin Chae, Anyang-si (KR); Hakseong Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 38 days.

(21) Appl. No.: 14/389,686

(22) PCT Filed: Apr. 8, 2013

(86) PCT No.: PCT/KR2013/002922
§ 371 (c)(1),
(2) Date: Sep. 30, 2014

(87) PCT Pub. No.: WO2013/151406
PCT Pub. Date: Oct. 10, 2013

(65) Prior Publication Data
US 2015/0110025 A1   Apr. 23, 2015

Related U.S. Application Data

(60) Provisional application No. 61/620,987, filed on Apr. 6, 2012.

(51) Int. Cl.
*H04B 7/02* (2006.01)
*H04L 27/26* (2006.01)
(Continued)

(52) U.S. Cl.
CPC .............. *H04B 7/024* (2013.01); *H04B 15/00* (2013.01); *H04L 27/2601* (2013.01); *H04L 5/005* (2013.01); *H04L 5/0035* (2013.01); *H04L 5/0053* (2013.01); *H04L 5/0073* (2013.01)

(58) Field of Classification Search
None
See application file for complete search history.

(56) References Cited

U.S. PATENT DOCUMENTS

| | | | | |
|---|---|---|---|---|
| 2010/0054196 A1* | 3/2010 | Hui | ......................... | H04W 16/00 370/329 |
| 2011/0044269 A1* | 2/2011 | Fan | ....................... | H04B 1/7105 370/329 |

(Continued)

FOREIGN PATENT DOCUMENTS

| | | |
|---|---|---|
| EP | 2280492 A1 | 2/2011 |
| KR | 1020110007957 A | 1/2011 |

(Continued)

OTHER PUBLICATIONS

Motorola, "Coordinated beamforming algorithms based on spatial covariance feedback and its gain over single-point Su/Mu beamforming", R1-093410, 3GPP TSG RAN1 #57, Shenzhen, China, Aug. 24-28, 2009.

*Primary Examiner* — Robert C Scheibel
(74) *Attorney, Agent, or Firm* — Dentons US LLP

(57) ABSTRACT

Disclosed are a method for performing coordinated beamforming in a wireless access system, and an apparatus for the method. More particularly, the method for performing coordinated beamforming in a wireless access system comprises: a step in which a terminal receives, from a base station, time unit information for scheduling coordinated beamforming, a step in which the terminal receives, from the base station, a downlink signal having a predetermined transmission pattern on a time-unit basis for scheduling coordinated beamforming; a step in which the terminal demodulates the downlink signal using a reference signal transmitted from the base station; and a step in which the terminal removes an interference signal transmitted from a neighboring base station using the same downlink signal, from among the received downlink signals, that was received in different antenna modes. The antenna mode of the terminal can be switched according to a predetermined pattern on a time-unit basis for scheduling coordinated beamforming.

12 Claims, 13 Drawing Sheets

(51) Int. Cl.
*H04B 15/00* (2006.01)
*H04L 5/00* (2006.01)

(56) References Cited

U.S. PATENT DOCUMENTS

| | | | |
|---|---|---|---|
| 2012/0058788 A1* | 3/2012 | Papadopoulos ...... | H04B 7/0452 455/501 |
| 2012/0069824 A1* | 3/2012 | Papadopoulos ........ | H04B 7/024 370/336 |
| 2012/0113795 A1* | 5/2012 | Ko ........................ | H04J 13/004 370/209 |
| 2012/0155411 A1* | 6/2012 | Ancora ................ | H04J 11/0056 370/329 |

FOREIGN PATENT DOCUMENTS

| | | | | |
|---|---|---|---|---|
| KR | 20110101033 A | 9/2011 | | |
| WO | WO 2011008062 A2 * | 1/2011 | ............ | H04J 13/004 |
| WO | 2011071470 A1 | 6/2011 | | |

* cited by examiner auxiliary antenna

FIG. 14

| Tx symbol of TX1 | $X_1$ | $X_1$ | | |
|---|---|---|---|---|

| Tx symbol of TX2 | $X_2$ | | $X_2$ | |
|---|---|---|---|---|

| Tx symbol of TX3 | $X_3$ | | | $X_3$ |
|---|---|---|---|---|

| Switching pattern of RX1 | 1 | 2 | 1 | 1 |
|---|---|---|---|---|
| Switching pattern of RX2 | 1 | 1 | 2 | 1 |
| Switching pattern of RX3 | 1 | 1 | 1 | 2 |

FIG. 15

| Tx symbol of TX1 | X₁ | X₁ |    |    | X₁ |    |    |
|---|---|---|---|---|---|---|---|
| Tx symbol of TX2 |    | X₂ | X₂ |    |    | X₂ |    |
| Tx symbol of TX3 |    |    | X₃ | X₃ |    |    | X₃ |
| Switching pattern of RX1 | 1 | 2 | 3 | 1 | 4 | 2 | 3 |
| Switching pattern of RX2 | 1 | 1 | 1 | 3 | 2 | 4 | 3 |
| Switching pattern of RX3 | 1 | 1 | 2 | 3 | 2 | 3 | 4 | ns # COORDINATED BEAMFORMING METHOD IN WIRELESS ACCESS SYSTEM, AND APPARATUS THEREFOR

This application is a National Stage Entry of International Application No. PCT/KR2013/002922 filed Apr. 8, 2013, which claims priority to U.S. Provisional Application Nos. 61/620,987 filed Apr. 6, 2012, each of which are incorporated herein by reference.

TECHNICAL FIELD

The present invention relates to a wireless communication system, and more particularly to a method for performing coordinated beamforming between contiguous base stations (BSs) in a wireless access system, and an apparatus for supporting the same.

BACKGROUND ART

The most important requirement of a next-generation wireless access system is to support a high data transfer rate. To achieve this, various technologies such as Multiple Input Multiple Output (MIMO), Cooperative Multiple Point Transmission (CoMP), relay, etc. have been developed and studied.

In a multi-cell/multi-user wireless communication environment, there is needed a technical scheme for effectively processing interference from contiguous cells or interference from other users. An interference cancellation method is greatly classified into three methods, i.e., Joint Transmission (JT), Coordinated Beamforming (CBF)/Joint Transmission (JT) of a transmitter, and a receive (Rx) interference cancellation (e.g., Receive Zero Forcing (RZF)). The first method, i.e., Joint Transmission (JT), has a disadvantage in that transmit (Tx) data and Channel State Information at Transmitter (CSIT) of a transmitter should be shared by all transmitters. The second method, i.e., CBF/JT, is characterized in that the transmitters share only channel state information (CSI) and transmits the CSI. The third method, i.e., Rx interference cancellation, is a method for allowing a receiver to perform zero forcing (ZF) using CSIR (Channel State Information at Receiver), so that additional channel information need not be fed back. If CSIT or CSIR is incorrect, throughput is deteriorated due to residual interference. Therefore, there is needed a specific method having robustness against correct channel information acquisition or CSIT/CSIR accuracy.

DISCLOSURE

Technical Problem

An object of the present invention is to provide a method and apparatus for facilitating coordinated beamforming between contiguous eNBs or BSs in a wireless access system.

An object of the present invention is to provide a method and apparatus for cancelling interference from an interference cell without receiving a channel estimation result or a channel information feedback result from a contiguous interference cell.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for supporting coordinated beamforming between base stations (BSs) in a wireless access system including: receiving, by a user equipment (UE), information of a time unit for scheduling the coordinated beamforming from a base station (BS); receiving, by the user equipment (UE), a downlink signal having a predetermined transmission pattern for the time unit for scheduling the coordinated beamforming from the base station (BS); demodulating, by the user equipment (UE), the downlink signal using a reference signal (RS) transmitted from the base station (BS); and cancelling, by the user equipment (UE), an interference signal transmitted from a contiguous base station (BS) using the same downlink signal received from different antenna modes from among the received downlink signals, wherein the antenna modes of the user equipment (UE) are switched to predetermined pattern, per time unit for scheduling the coordinated beamforming.

In a second technical aspect of the present invention, a user equipment (UE) device for supporting coordinated beamforming between base stations (BSs) in a wireless access system includes: a radio frequency (RF) unit configured to transmit/receive a radio frequency (RF) signal; and a processor, wherein the processor receives information of a time unit for scheduling the coordinated beamforming from a base station (BS), receives a downlink signal having a predetermined transmission pattern for the time unit for scheduling the coordinated beamforming from the base station (BS), demodulates the downlink signal using a reference signal (RS) transmitted from the base station (BS), and cancels an interference signal transmitted from a contiguous base station (BS) using the same downlink signal received from different antenna modes from among the received downlink signals, wherein the antenna modes of the RF unit are switched to predetermined pattern, per time unit for scheduling the coordinated beamforming.

The time unit for scheduling the coordinated beamforming may be any one of a subframe, a slot, and an orthogonal frequency division multiplexing The transmission pattern of the downlink signal may be comprised of different patterns between contiguous base stations (BSs).

The transmission pattern may be decided by a cell ID.

The method may further include: receiving information regarding the transmission pattern from the base station (BS).

The reference signal (RS) may be a common reference signal (CRS) or a demodulation reference signal (DMRS).

Advantageous Effects

As is apparent from the above description, the embodiments of the present invention can facilitate coordinated beamforming between contiguous eNBs or BSs in a wireless access system.

The embodiments of the present invention can self-remove interference from an interference cell without receiving a channel estimation result or a channel information feedback result from the interference cell.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIGS. 14 and 15 exemplarily show antenna mode switching patterns of respective receivers and transmit (Tx) symbol formats of respective transmitters when 3 cells support coordinated beamforming.

BEST MODE

Figure 1:
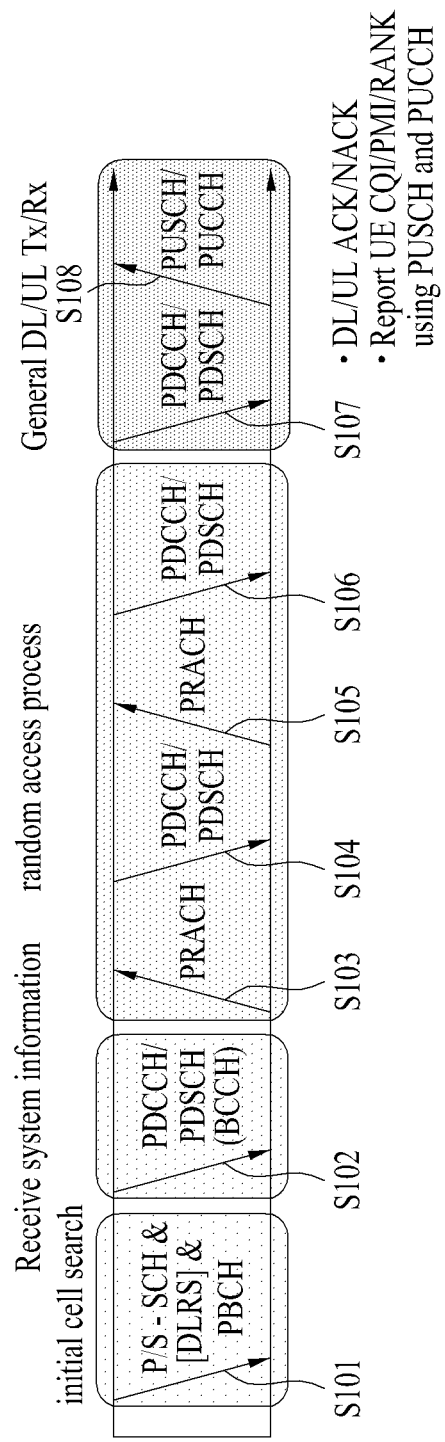
FIG. 1 is a conceptual diagram illustrating physical channels used in a 3GPP LTE system and a general method for transmitting a signal using the physical channels.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

In some cases, in order to prevent ambiguity of the concepts of the present invention, conventional devices or apparatuses well known to those skilled in the art will be omitted and denoted in the form of a block diagram on the basis of important functions of the present invention.

The embodiments of the present invention are disclosed on the basis of a data communication relationship between a base station and a terminal. In this case, the base station is used as a terminal node of a network via which the base station can directly communicate with the terminal Specific operations to be conducted by the base station in the present invention may also be conducted by an upper node of the base station as necessary. In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with the terms fixed station, Node-B, eNode-B (eNB), or an access point (AP) as necessary. The term "relay" may be replaced with a Relay Node (RN) or a Relay Station (RS). The term "terminal" may also be replaced with the terms User Equipment (UE), Mobile Station (MS), Mobile Subscriber Station (MSS), Subscriber Station (SS), Advanced Mobile Station (AMS), Wireless Terminal (WT), Machine-Type Communication (MTC) apparatus, Machine-to-Machine (M2M) apparatus or Device-to-Device (D2D) apparatus as necessary.

It should be noted that specific terms disclosed in the present invention are proposed for convenience of description and better understanding of the present invention, and the use of these specific terms may be changed to another format within the technical scope or spirit of the present invention.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, an LTE-Advanced (LTE-A) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied with wireless (or radio) technology such as UTRA (Universal Terrestrial Radio Access) or CDMA2000. TDMA may be embodied with wireless (or radio) technology such as GSM (Global System for Mobile communications)/GPRS (General Packet Radio Service)/EDGE (Enhanced Data Rates for GSM Evolution). OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of the UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE—Advanced (LTE-A) is an evolved version of 3GPP LTE.

For clarity, the following description focuses on 3GPP LTE and 3GPP LTE-A. However, technical features of the present invention are not limited thereto.

Overview of 3GPP LTE/LTE-A Systems Applicable to the Present Invention

FIG. 1 is a conceptual diagram illustrating physical channels for use in a 3GPP system and a general method for transmitting a signal using the physical channels.

Referring to FIG. 1, when powered on or when entering a new cell, a UE performs initial cell search in step S101. The initial cell search involves synchronization with a BS. Specifically, the UE synchronizes with the BS and acquires a cell Identifier (ID) and other information by receiving a Primary Synchronization Channel (P-SCH) and a Secondary Synchronization Channel (S-SCH) from the BS.

Then the UE may acquire information broadcast in the cell by receiving a Physical Broadcast Channel (PBCH) from the BS. During initial cell search, the UE may monitor a downlink channel status by receiving a downlink Reference Signal (DL RS).

After initial cell search, the UE may acquire more specific system information by receiving a Physical Downlink Control Channel (PDCCH) and receiving a Physical Downlink Shared Channel (PDSCH) based on information of the PDCCH in step S102.

Thereafter, if the UE initially accesses the BS, it may perform random access to the BS in steps S103 to S106. For random access, the UE may transmit a preamble to the BS on a Physical Random Access Channel (PRACH) in step S103 and receive a response message for random access on a PDCCH and a PDSCH corresponding to the PDCCH in step S104. In the case of contention-based random access, the UE may transmit an additional PRACH in step S105, and receive a PDCCH and a PDSCH corresponding to the PDCCH in step S106 in such a manner that the UE can perform a contention resolution procedure.

After the above random access procedure, the UE may receive a PDCCH/PDSCH (S107) and transmit a Physical Uplink Shared Channel (PUSCH)/Physical Uplink Control Channel (PUCCH) (S108) in a general uplink/downlink signal transmission procedure.

Control information that the UE transmits to the BS is referred to as uplink control information (UCI). The UCI includes a Hybrid Automatic Repeat and reQuest ACKnowl-edgment/Negative-ACK (HARQ ACK/NACK) signal, a Scheduling Request (SR), Channel Quality Indictor (CQI), a Precoding Matrix Index (PMI), and a Rank Indicator (RI).

In the LTE system, UCI is transmitted on a PUCCH, in general. However, the UCI can be transmitted on a PUSCH when control information and traffic data need to be transmitted simultaneously. Furthermore, the UCI can be aperiodically transmitted on a PUSCH at the request/instruction of a network.

Figure 2:
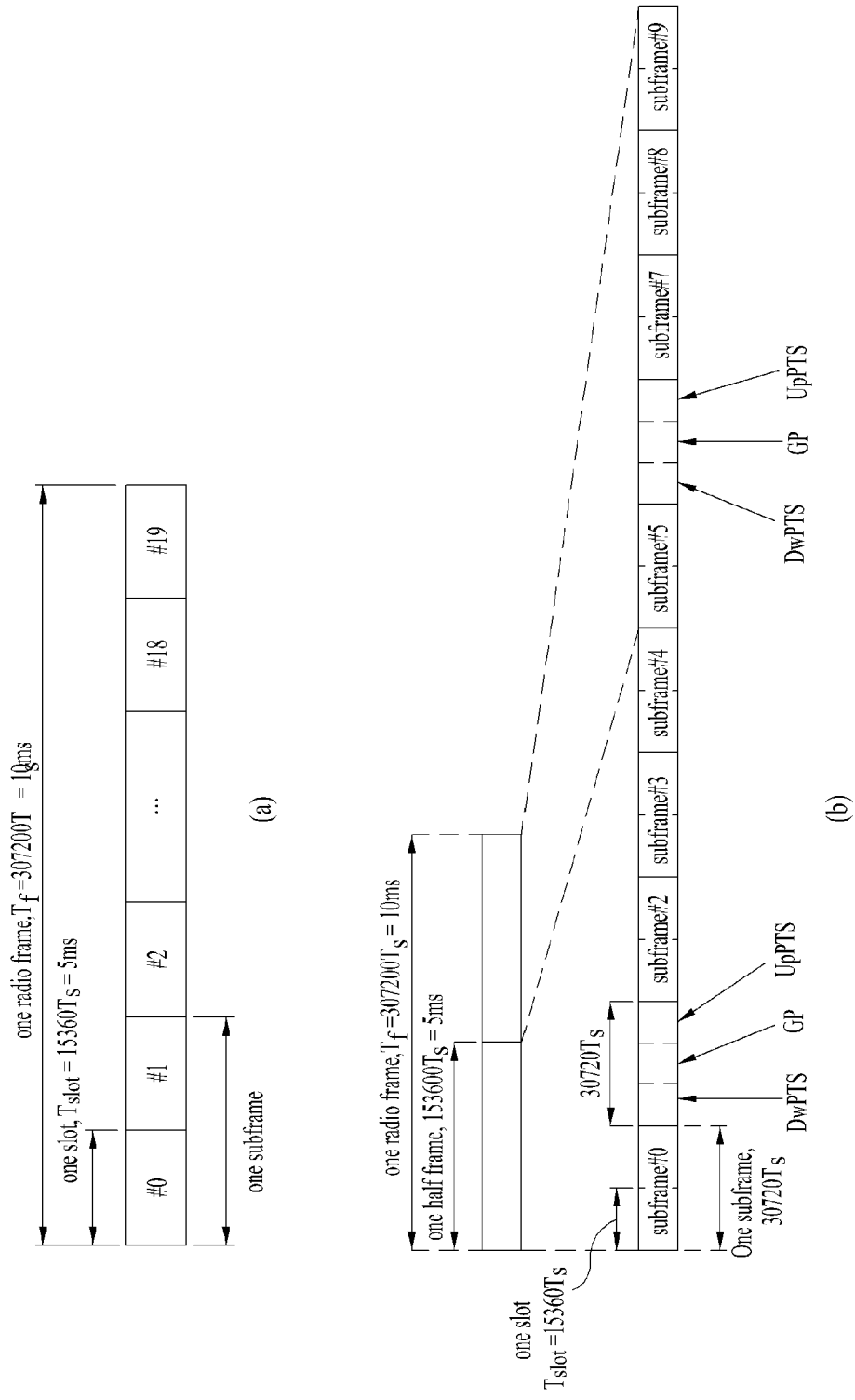
FIG. 2 is a diagram illustrating a structure of a radio frame for use in a 3GPP LTE system.

FIG. 2 is a diagram illustrating a structure of a radio frame for use in a 3GPP LTE system.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type 1 radio frame structure applicable to FDD (frequency division duplex) and a type 2 radio frame structure applicable to TDD (time division duplex) are supported.

FIG. 2 (*a*) is a diagram for a structure of a type 1 radio frame. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDMA in downlink, OFDM symbol is provided to indicate one symbol interval. The OFDM symbol may be named SC-FDMA symbol or symbol interval. Resource block (RB) is a resource allocation unit and may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

FIG. 2(*b*) is a diagram for a structure of a downlink radio frame of type 2. A type 2 radio frame includes 2 half frames. Each of the half frame includes 5 subframes, a DwPTS (downlink pilot time slot), a GP (guard period), and an UpPTS (uplink pilot time slot). Each of the subframes includes 2 slots. The DwPTS is used for initial cell search, synchronization, or a channel estimation in a user equipment. The UpPTS is used for channel estimation of a base station and matching a transmission synchronization of a user equipment. The guard period is a period for eliminating interference generated in uplink due to multi-path delay of a downlink signal between uplink and downlink.

The above-described structures of the radio frame are exemplary only. And, the number of subframes included in a radio frame, the number of slots included in the subframe and the number of symbols included in the slot may be modified in various ways.

Figure 3:
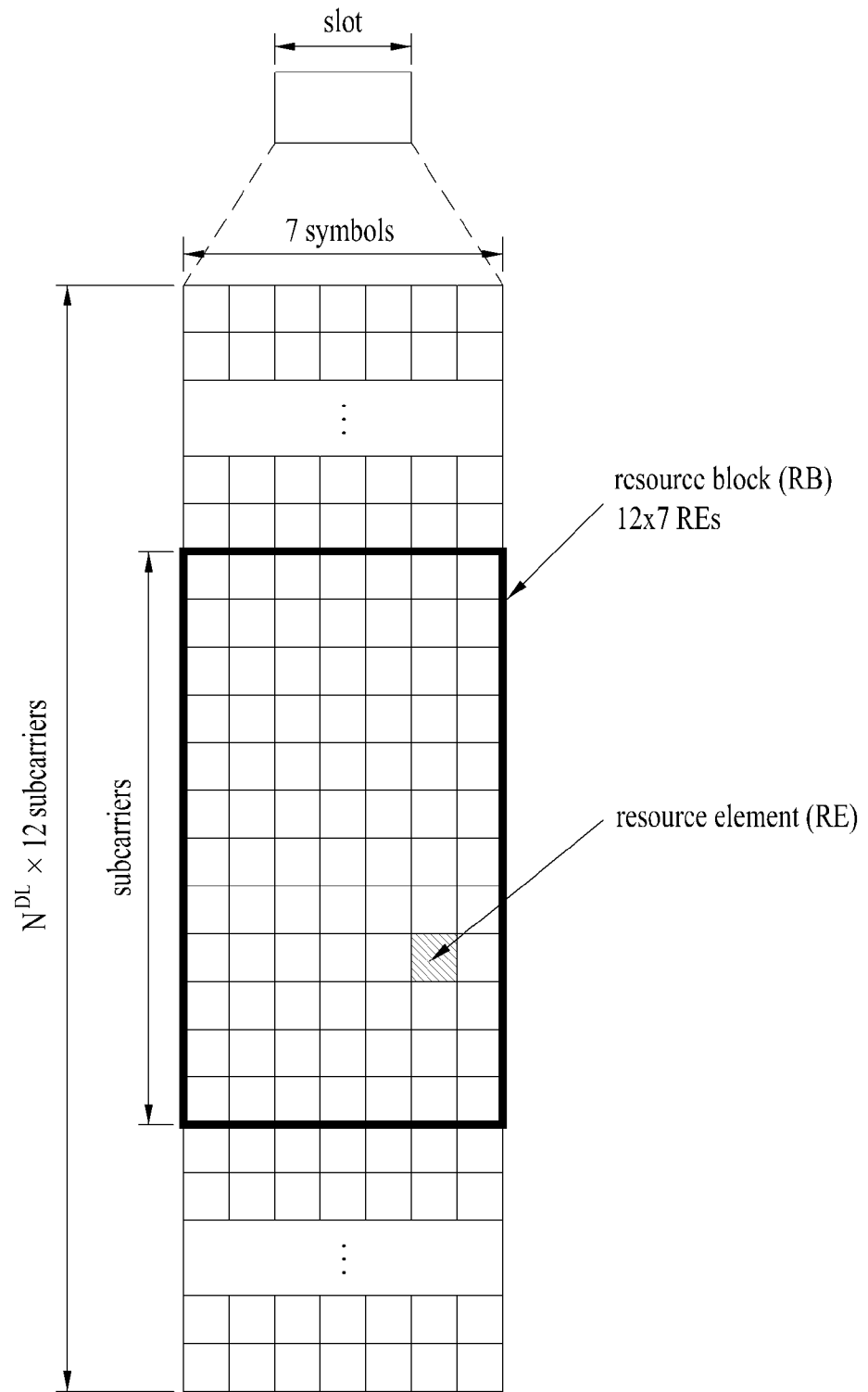
FIG. 3 exemplarily shows a resource grid of a single downlink slot.

FIG. 3 exemplarily shows a resource grid of a single downlink slot.

Referring to FIG. 3, one downlink slot includes a plurality of OFDM symbols in a time domain. Although one downlink slot includes 7 OFDM symbols and one resource block (RB) includes 12 subcarriers in a frequency domain, the scope or spirit of the present invention is not limited thereto.

Each element on a resource grid may be defined as a resource element (RE). One RB includes 12×7 REs. The number ($N^{DL}$) of RBs contained in a downlink slot is dependent upon a downlink transmission bandwidth. An uplink slot structure is identical to the downlink slot structure.

Figure 4:
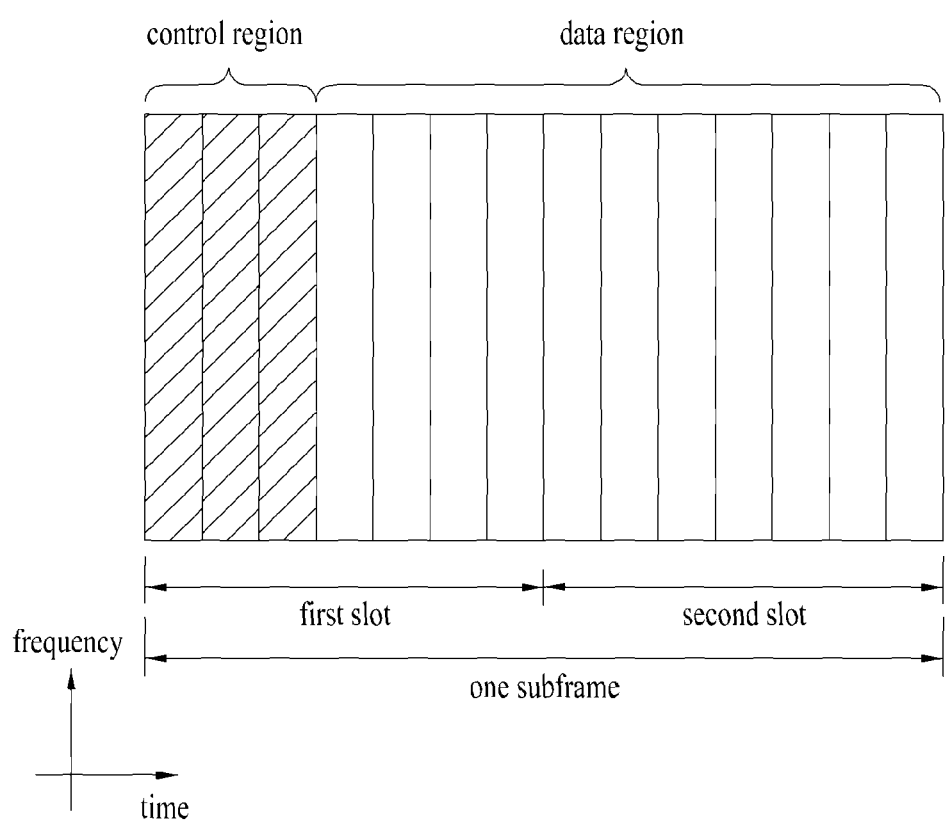
FIG. 4 illustrates a downlink subframe structure.

FIG. 4 illustrates a downlink subframe structure.

Referring to FIG. 4, a maximum of three OFDM symbols located in the front of a first slot of the subframe are used as a control region to which control channels are allocated, and the remaining OFDM symbols are used as a data region to which a Physical Downlink Shared Channel (PDSCH) is allocated. DL control channels for use in the 3GPP LTE system include a Physical Control Format Indicator Channel (PCFICH), a Physical Downlink Control Channel (PDCCH), a Physical Hybrid-ARQ Indicator Channel (PHICH), and the like.

PCFICH transmitted through a first OFDM symbol of the subframe may carry information about the number of OFDM symbols (i.e., size of the control region) used for transmission of control channels within the subframe.

PHICH serving as a response channel to an uplink may carry ACK (Acknowledgement)/NACK (Non-Acknowledgement) signals about a Hybrid Automatic Repeat Request (HARQ). Control information transmitted over a PDCCH is referred to as Downlink Control Information (DCI). For example, DCI includes uplink resource allocation information (UL grant), downlink resource allocation information (DL grant), or an uplink transmission (UL Tx) power control command for an arbitrary UE group, etc.

PDCCH may carry information about resource allocation and transmission format (DL grant) of a downlink shared channel (DL-SCH), resource allocation information (UL grant) of an uplink shared channel (UL-SCH), paging information of a paging channel (PCH), resource allocation information about an upper layer control message such as a random access response transmitted over a PDSCH, a set of transmission power control commands for each UE contained in an arbitrary UE group, and information about Voice over Internet Protocol (VoIP) activation, etc. A plurality of PDCCHs may be transmitted within the control region, and the UE may monitor the PDCCHs. Each PDCCH includes an aggregate of one or more contiguous control channel elements (CCEs). A CCE is a logical allocation unit for providing a coding rate based on a radio frequency (RF) channel status to the PDCCH. A CCE may correspond to a plurality of resource element groups. PDCCH format and the number of available PDCCHs may be determined according to the relationship between the number of CCEs and the coding rate provided by CCEs.

A base station (BS) determines PDCCH format in accordance with DCI to transmit to a user equipment (UE) and attaches CRC (cyclic redundancy check) to control information. The CRC is masked with a unique identifier (called RNTI (radio network temporary identifier)) in accordance with an owner or usage of PDCCH. If the PDCCH is provided for a specific user equipment (UE), the CRC can be masked with a unique identifier of the user equipment (UE), i.e., C-RNTI (i.e., Cell-RNTI). If the PDCCH is provided for a paging message, the CRC can be masked with a paging indication identifier (e.g., P-RNTI (Paging-RNTI)). If the PDCCH is provided for system information, and more particularly, for a system information block (SIB), the CRC can be masked with a system information identifier (e.g., SI-RNTI (system information-RNTI)). In order to indicate a random access response that is a response to a transmission of a random access preamble of a user equipment (UE), CRC can be masked with RA-RNTI (random access-RNTI).

Figure 5:
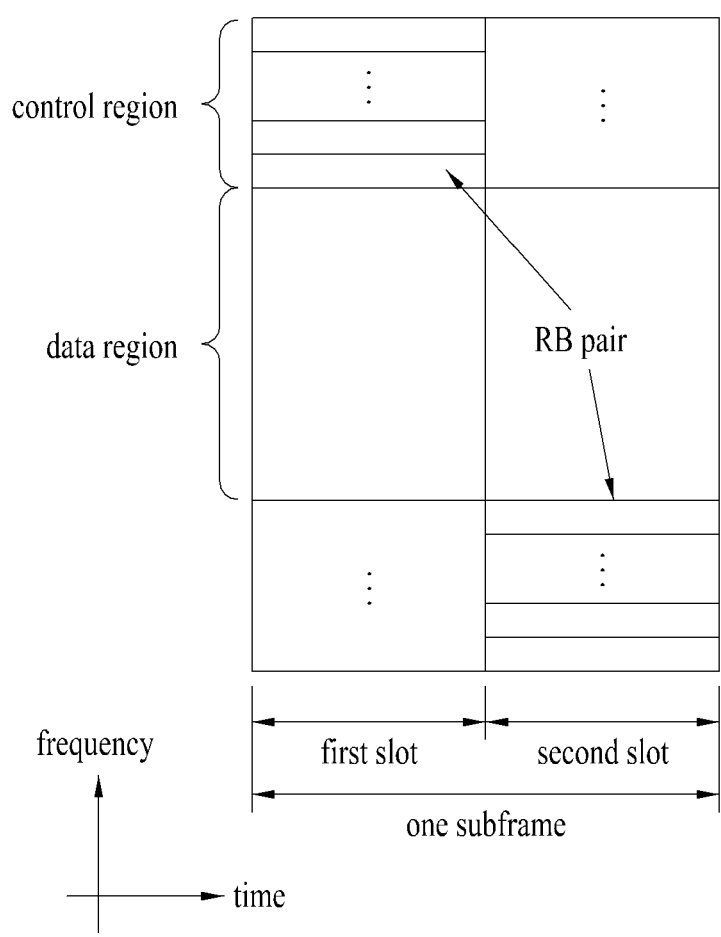
FIG. 5 illustrates an uplink subframe structure.

FIG. 5 illustrates an uplink subframe structure.

Referring to FIG. 5, a UL subframe is divided into a control region and a data region in the frequency domain. PUCCH carrying UL control information is allocated to the control region. PUSCH carrying user data is allocated to the data region. In order to maintain a single carrier property, one UE does not simultaneously transmit a PUCCH signal and a PUSCH signal. A PUCCH for one UE is allocated in an RB pair in a subframe and RBs belonging to the RB pair occupy different subcarriers in each of two slots. Thus, the RB pair allocated to the PUCCH is frequency-hopped on a slot boundary.

Multi-Input Multi-Output (MIMO) System

Figure 6:
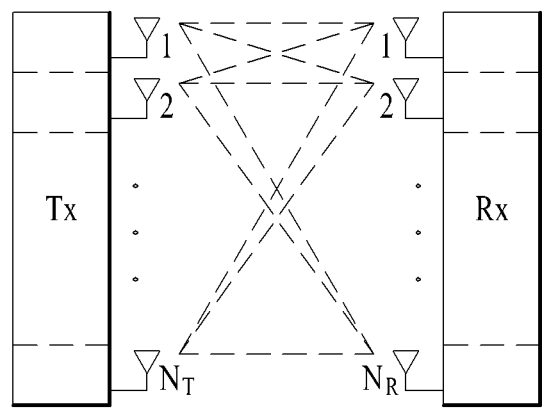
FIGS. 6 and 7 are block diagrams illustrating a wireless communication system having multiple antennas.
Figure 7:
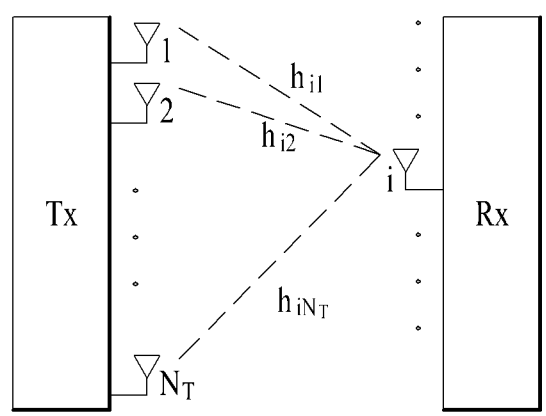

FIGS. 6 and 7 are block diagrams illustrating a wireless communication system having multiple antennas.

Referring to FIG. 6, when both the number of Tx antennas and the number of Rx antennas respectively to $N_T$ and $N_R$, a theoretical channel transmission capacity is increased, compared to use of a plurality of antennas at only one of a transmitter and a receiver. The channel transmission capacity is increased in proportion to the number of antennas. Therefore, transmission rate and frequency efficiency can be increased remarkably. Given a maximum transmission rate $R_o$ that may be achieved with a single antenna, the transmission rate may be increased, in theory, to the product of $R_o$ and a transmission rate increase rate $R_i$ illustrated in Equation 1 due to an increase in channel transmission capacity in case of multiple antennas.

$$R_i = \min(N_T, N_R) \quad \text{[Equation 1]}$$

For instance, a MIMO communication system with 4 Tx antennas and 4 Rx antennas may achieve a four-fold increase in transmission rate theoretically, relative to a single-antenna system. The theoretical increase in transmission rate of MIMO communication was demonstrated in the mid-1990s, various technologies for improving data rate have been actively studied since then and are now employed in various wireless communication standards such as $3^{rd}$ generation mobile communication and next-generation wireless LAN.

A variety of research such as information theory research related to calculation of multi-antenna throughput in various channel environments and multiple access environments, research on radio channel measurement and model derivation in MIMO systems and research on time spatial signal processing technology for improvement of transmission reliability and data rate are underway.

Communication in a MIMO system will be described in detail through mathematical modeling. It is assumed that $N_T$ Tx antennas and $N_R$ Rx antennas are present.

Regarding a transmission signal, up to $N_T$ pieces of information can be transmitted through the $N_T$ Tx antennas, as expressed as the following vector.

$$s = [s_1, s_2, \ldots, s_{N_T}]^T \quad \text{[Equation 2]}$$

A different transmission power may be applied to each piece of transmission information, $s_1, s_2, \ldots, s_{N_T}$. Let the transmission power levels of the transmission information be denoted by $P_1, P_2 \ldots P_{N_T}$, respectively. Then the transmission power-controlled transmission information vector is given as follows.

$$\hat{s} = [\hat{s}_1, \hat{s}_2, \ldots, \hat{s}_{N_T}]^T = [P s_1, P s_2, \ldots, P s_{N_T}]^T \quad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector X, which may be determined by Equation 5.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{12} & w_{12} & \cdots & w_{2N_T} \\ \vdots & & \ddots & \\ w_{i2} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

Herein, $w_{ij}$ denotes a weight between an $i^{th}$ Tx antenna and a $j^{th}$ piece of information. W is called a weight matrix or a precoding matrix.

Given $N_R$ Rx antennas, signals received at the respective Rx antennas, $y_1, y_2, \ldots, y_{N_R}$ may be represented as the following vector.

$$y = [y_1, y_2, \ldots, y_{N_R}]^T \quad \text{[Equation 6]}$$

When channels are modeled in the MIMO communication system, they may be distinguished according to the indexes of Tx and Rx antennas and the channel between a $j^{th}$ Tx antenna and an $i^{th}$ Rx antenna may be represented as $h_{ij}$. It is to be noted herein that the index of the Rx antenna precedes that of the Tx antenna in $h_{ij}$.

FIG. 7 illustrates channels from $N_T$ Tx antennas to an $i^{th}$ Rx antenna. The channels may be represented as vectors and matrices by grouping them. As illustrated in FIG. 7, the channels from the $N_T$ Tx antennas to an $i^{th}$ Rx antenna may be expressed as follows.

$$h_i^T = [H_{i1}, h_{i2}, \ldots, h_{iN_T}] \quad \text{[Equation 7]}$$

Also, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & & \ddots \\ h_{N_R 1} & h_{N_R 2} & \cdots & h_{N_R N_T} \end{bmatrix} \quad \text{[Equation 8]}$$

Actual channels experience the above channel matrix H and then are added with Additive White Gaussian Noise (AWGN). The AWGN $n_1, n_2, \ldots, n_{N_R}$ added to the $N_R$ Rx antennas is given as the following vector.

$$n = [n_1, n_2, \ldots, n_{N_R}]^T \quad \text{[Equation 9]}$$

From the above modeled equations, the received signal can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Equation 10]}$$

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$. Thus, the channel matrix H is of size $N_R \times N_T$.

In general, the rank of a matrix is defined as the smaller between the numbers of independent rows and columns. Accordingly, the rank of the matrix is not larger than the number of rows or columns. The rank of the matrix H, rank(H) is limited as follows.

$$\text{rank}(H) \leq \min(N_T, N_R) \quad \text{[Equation 11]}$$

The rank of a matrix may be defined as the number of non-zero Eigen values when the matrix is Eigen-value-decomposed. Similarly, the rank of a matrix may be defined as the number of non-zero singular values when the matrix is singular-value-decomposed. Accordingly, the physical meaning of the rank of a channel matrix can be a maximum number of channels through which different pieces of information can be transmitted.

Multi-User-MIMO (MU-MIMO) Operation

MU-MIMO is a scheme by which a BS including multiple antennas simultaneously provides a service to a plurality of users (UEs). When one BS simultaneously provides a service to a plurality of UEs, a signal transmitted to a UE may interfere with a signal delivered to another UE, deteriorating system performance. Accordingly, it is necessary to eliminate interference between UEs to successfully transmit/received data according to MU-MIMO. To achieve this, the BS can perform signal processing on signals to be transmitted to a plurality of UEs according to an interference cancellation technique.

The BS can encode information blocks to be delivered to UEs into independent codewords. The encoded codewords can be transmitted according to the interference cancellation technique. For example, the BS can cancel interference in advance for codewords transmitted from the BS to a plurality of UEs. When a signal transmitted to a UE $U_1$ is pre-subtracted from a signal transmitted to another UE $U_2$, the UE $U_2$ can receive the signal from the BS as if there is no interference, and thus additional interference cancellation need not be performed. ZF-DPC (Zero Forcing-Dirty Paper coding), ZF (Zero Forcing) or the like can be used as an interference cancellation technique.

ZF-DPC is described first. When it is assumed that two UEs $U_1$ and $U_2$ are simultaneously provided with a service from a BS, a composite channel of a channel h1 of the UE $U_1$ and a channel h2 of the UE $U_2$ may be H=[h1 h2]. The composite channel H can be decomposed into a lower triangular matrix L and an orthogonal matrix Q, as represented by Equation 12, through LQ decomposition.

$$H = LQ = \begin{bmatrix} l_{11} & 0 \\ l_{21} & l_{22} \end{bmatrix} \begin{bmatrix} q_{11} & q_{12} \\ q_{21} & q_{22} \end{bmatrix} \quad \text{[Equation 12]}$$

When MIMO transmission is performed using columns of the matrix Q of Equation 12 as a beamforming vector, only the lower triangular matrix L remains in a signal received by a UE. If the BS knows channel environments of both the UEs, it is possible to perform encoding in such a manner that a component encoded without interference of the first row is transmitted avoiding an interference component of the second row. When a beamforming vector $w_i$ for each UE is $w_i = q_i$ (i.e. the beamforming vector for $U_1$ is $W_1$ and a beamforming vector for U$_2$ is w), an effective channel can be represented by Equation 13. Accordingly, a signal from which interference from a signal transmitted to another UE has been subtracted can be transmitted to a UE, and thus the UE can successfully receive the signal from the BS without additional interference cancellation operation.

$$h_i w_k = \begin{cases} l_{ii} & i = k \\ 0 & i \neq k \end{cases} \quad \text{[Equation 13]}$$

In the case of ZF beamforming, interference cancellation can be performed through pseudo-inverse of the composite channel H for multiple UEs, as represented by Equation 14.

$$F = H^H (H H^H)^{-1} \quad \text{[Equation 14]}$$

In Equation 14, $X^H$ denotes a Hermitian matrix of a matrix X and $X^{-1}$ denotes an inverse matrix of the matrix X. Each column of the matrix F of Equation 14 corresponds to a beamforming vector for each UE. That is, $w_i = f_i$. In this case, an effective channel for each UE can be represented by Equation 15.

$$h_i w_k = \begin{cases} \frac{1}{\|w_i\|} & i = k \\ 0 & i \neq k \end{cases} \quad \text{[Equation 15]}$$

When ZF is used, a channel of each UE takes in the form of an identity matrix, and thus each UE can receive a signal from which interference has been cancelled in advance.

Coordinated Multi-Point (CoMP) System

In order to meet the requirements of LTE-A, coordinated multi-point (CoMP) transmission (usually referred to as co-MIMO, collaborative MIMO, network MIMO, etc.) has been proposed for system performance enhancement. CoMP can increase cell-edge UE performance and enhance average sector throughput.

In general, inter-cell interference (ICI) may reduce cell-edge UE performance and average sector throughput under a multi-cell environment with a frequency reuse factor of 1. To mitigate ICI, a simple passive technique, such as fractional frequency reuse (FFR) with UE specific power control has been employed in LTE in order to provide reasonable throughput performance for cell-edge UEs in an interference-limited environment. Instead of reducing frequency resource usage per cell, it is more beneficial to reuse ICI as a desired signal or mitigate the ICI. To accomplish the above object, CoMP transmission is applicable.

CoMP schemes applicable to downlink may be categorized into joint processing (JP) and coordinated scheduling/beamforming (CS/CB).

In JP, each point (eNB) of a CoMP coordination unit may use data. The CoMP coordination unit refers to a set of eNBs used for a coordinated transmission scheme. JP may be divided into joint transmission and dynamic cell selection.

Joint transmission refers to a scheme through which PDSCHs are simultaneously transmitted from a plurality of points (some or all CoMP coordination units). That is, data may be simultaneously transmitted to a single UE from a plurality of transmission points. Through joint transmission, quality of a received signal may be improved coherently or non-coherently and interference on other UEs may be actively eliminated.

Dynamic cell selection refers to a scheme by which a PDSCH is transmitted from one point (in a CoMP coordination unit). That is, data is transmitted to a single UE from a single point at a specific time, other points in the coordination unit do not transmit data to the UE at the time, and the point that transmits the data to the UE may be dynamically selected.

According to the CS/CB scheme, CoMP coordination units may collaboratively perform beamforming of data transmission to a single UE. Here, user scheduling/beaming may be determined according to coordination of cells in a corresponding CoMP coordination unit although data is transmitted only from a serving cell.

In case of uplink, coordinated multi-point (CoMP) reception refers to reception of a signal transmitted according to coordination among a plurality of points geographically spaced apart from one another. A CoMP reception scheme applicable to uplink may be classified into joint reception (JR) and coordinated scheduling/beamforming (CS/CB).

JR is a scheme in which all or some points of a CoMP unit receives a signal transmitted over a PDSCH. CS/CB is a scheme in which user scheduling/beamforming is determined according to coordination among cells in a corresponding CoMP unit while one point receives signals over a PDSCH.

Blind Coordinated BF

Figure 8:
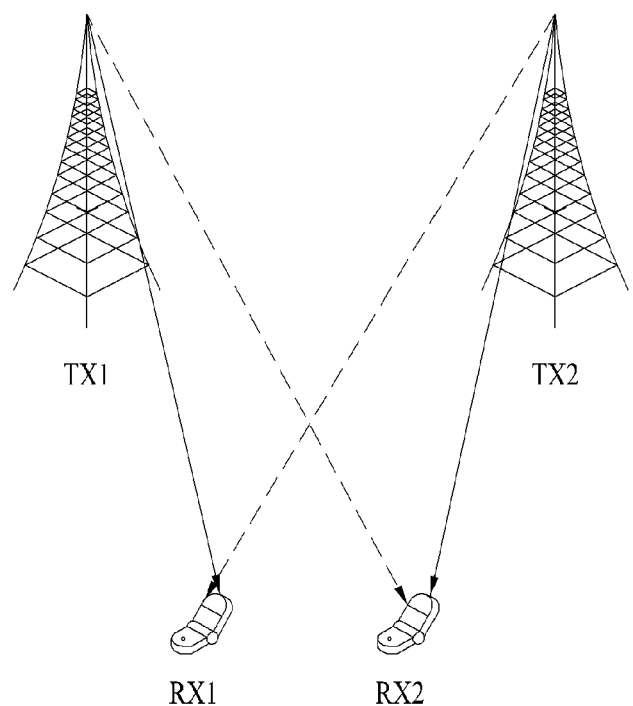
FIG. 8 is a conceptual diagram illustrating a MIMO interference channel between two UEs.

FIG. 8 is a conceptual diagram illustrating a MIMO interference channel between two UEs.

Referring to FIG. 8, although each transmitter (TX, for example, eNB or BS) transmits data only to a desired receiver (RX, for example, UE), each RX may receive interference from another TX. In FIG. 8, if TX 1 transmits data only to RX1 and TX 2 transmits data only to RX 2, and if TX 1 and TX 2 transmit data using the same time/frequency resources, RX 1 may receive interference from TX 2, and RX 2 may receive interference from TX 1.

In order to control interference from the contiguous TX, the following two situations may be considered.

Assuming that each of two TXs has four transmit (Tx) antennas and two RXs have two Tx antennas, if the number of streams transmitted from both transmitters (TXs) is 2 or higher, interference can be eliminated through CBF or JT. However, if backhaul (e.g., X2 interface) capacity between the BSs is limited and the BSs cannot share transmit (Tx) data, CBF must be carried out. In this case, RX 1 may report a low-interference PMI to TX 2 and RX 2 may report a low-interference PMI to TX 1, such that coordinated beamforming having less interference can be carried out. However, if interference from the contiguous cell is very high due to a channel estimation error or a quantization error, other additional interference control schemes are needed.

Assuming that each of TX 1 and TX 2 has four Tx antennas and each of RX 1 and RX 2 has four receive (Rx) antennas, interference can be cancelled using a receive ZF (RZF) without PMI feedback. However, if CSIR at RX is incomplete, residual interference may occur.

The present invention provides a new interference control scheme applicable to the above two situations. That is, the present invention provides a blind intercell interference control method which does not greatly reduce a multiplexing gain of a desired link using receive (Rx) antenna switching and need not feed back channel information to an interference transmitter (TX) without interference channel estimation.

For convenience of description and better understanding of the present invention, it is assumed that a receiver RX (e.g., UE) of the present invention has a reconfigurable antenna.

Figure 9:
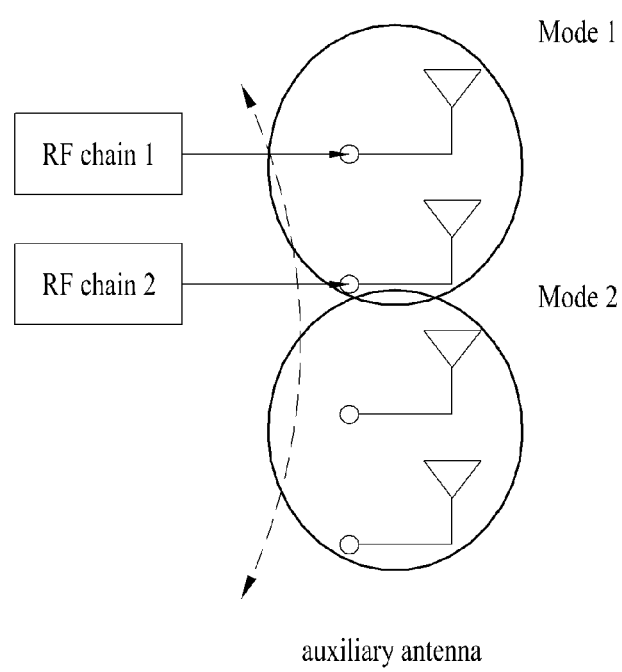
FIG. 9 is a conceptual diagram illustrating reconfigurable antennas of a UE to support blind coordinated beamforming according to an embodiment of the present invention.

FIG. 9 is a conceptual diagram illustrating reconfigurable antennas of a UE to support blind coordinated beamforming according to an embodiment of the present invention.

Referring to FIG. 9, the UE exemplarily shows two auxiliary antennas and two RF chains. In this case, each RF chain can be switched to a desired antenna (e.g., a main antenna or an auxiliary antenna) at a desired time. This desired antenna may be referred to as a reconfigurable antenna. Although the reconfigurable antenna can be implemented by a scheme in which the number of actual RF chains is different from the number of physical antennas as shown in FIG. 9, the antenna can also be implemented by a scheme in which the antenna can form a beam as an electrical signal (for example, polarization of the antenna may be changed or the antenna pattern may be changed.). If the antenna forms a beam as an electrical signal, the number of RF chains may be identical to the number of antennas. Alternatively, the beam pattern for use in M physical antennas and the beam pattern for use in M RF chains are changed, such that the reconfigurable antenna can be implemented. However, the above-mentioned description can be applied to the case in which the transmitter (TX) transmits a stream of Rank M or less. Therefore, for example, assuming that the transmitter (TX) has four antennas and the receiver (RX) has two antennas and two RF chains, the present invention can be applied to the case in which the transmitter (TX) transmits a stream of Rank 2 or less.

The reconfigurable antenna may be implemented to perform a high speed switching through micro electromechanical switches (MEMS), nano electromechanical switches (NEMS), etc. In addition, the reconfigurable antenna may have M modes according to a signal scattering situation of a UE peripheral part and a performance of the reconfigurable antenna. In this case, the term 'mode" may indicate that channel characteristics are greatly changed according to reconfigurable properties. Accordingly, the receiver (RX) may receive a desired beam pattern at a specific time. In addition, the number of significant modes (meaningful in throughput change) may be changed according to UEs.

Referring to the antennas shown in FIG. 9, there are four antennas, there are two RF chains, respective RF chains may be connected to two different antennas. These antennas may be referred to as reconfigurable antennas each having two preset modes. A channel state can be changed using the reconfigurable antenna. It is assumed that a channel state is changed only by the mode switching of the reconfigurable antenna. Therefore, the present invention can be applied to UEs each having a static channel.

In accordance with the legacy Rx antenna switching researches, antennas are switched to maximize a channel gain in a point-to-point MIMO channel. This antenna switching is referred to as selfish-mode switching. In accordance with the present invention, each receiver (RX) does not perform antenna switching using a predetermined pattern for each receiver (RX), instead of performing the selfish-mode switching, and the transmitter (TX) may transmit transmit (Tx) symbols according to the RX switching pattern.

As can be seen from the example of FIG. 9, assuming that four transmit (Tx) antennas of the transmitter (TX) are present and each receiver (RX) has two reconfigurable antennas having two preset modes, RX 1 and RX 2 may have the switching patterns as shown in the following table 1.

TABLE 1

| Switching Pattern of RX1 | Switching Pattern of RX2 |
|---|---|
| $m_1(1) = 1$ | $m_2(1) = 1$ |
| $m_1(2) = 1$ | $m_2(2) = 2$ |
| $m_1(3) = 2$ | $m_2(3) = 1$ |

Figure 10:
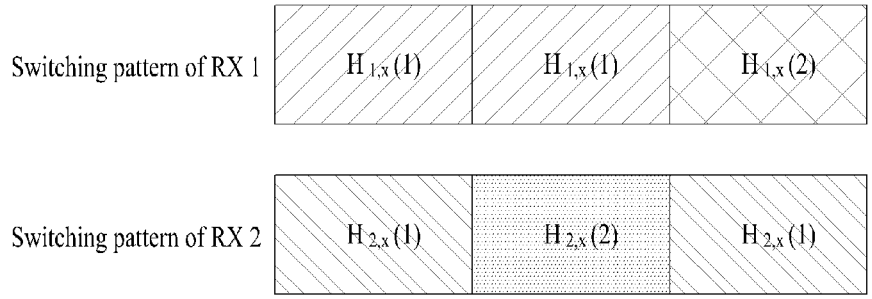
FIG. 10 is a conceptual diagram illustrating a channel state changed by an antenna switching pattern of a transmitter according to an embodiment of the present invention.

In Table 1, $m_i(n)$ is an antenna switching mode of the i-th receiver (RX) at the n-th time. Assuming that a channel is changed when antenna switching is performed as shown in Table 1, a channel state caused by antenna switching can be described as shown in FIG. 10. Of course, the antenna switching pattern for each RX shown in Table 1 is disclosed for illustrative purposes only, and it should be noted that other antenna switching patterns may also be applied to the present invention.

FIG. 10 is a conceptual diagram illustrating a channel state changed by an antenna switching pattern of a transmitter according to an embodiment of the present invention.

Referring to FIG. 10, RX 1 has the same switching mode '1' at each of the first and second unit times (e.g., symbols), so that the first and second unit times have the same channel state. However, since the switching mode is changed to 2 at the third unit time, the channel state is also changed at the third unit time. In the case of RX 2, a switching mode is set to 1 at the first unit time, and the switching mode is changed to 2 at the second unit time, so that the switching mode is changed to a channel state. The switching mode is set again to 1 at the third unit time, so that RX 2 has the same channel state as in the first unit time.

In the antenna switching pattern shown in Table 1, the transmitter (TX) can transmit Tx symbols as shown in the following Table 2.

TABLE 2

| t | Transmit (Tx) symbols of TX 1 | Transmit (Tx) symbols of TX 2 |
|---|---|---|
| 1 | $X_1(1) = X_1$ | $X_2(1) = X_2$ |
| 2 | $X_1(2) = 0_{4 \times 1}$ | $X_2(2) = X_2$ |
| 3 | $X_1(3) = X_1$ | $X_2(3) = 0_{4 \times 1}$ |

In Table 2, $X_i$ is a 4×1-sized transmit (Tx) symbol vector of the i-th transmitter (TX). That is, each TX may transmit four streams to each RX (i.e., Rank 4). Tx symbol patterns of respective transmitters (TXs) shown in Table 2 is disclosed for illustrative purposes only, and it should be noted that different symbol patterns may also be applied to the present invention.

Receive (Rx) signals obtained for 3 unit times (i.e., symbols) of RX 1 are denoted by the following equation 16.

$$Y_1(1) = H_{1,1}(1)X_1 + H_{1,2}(1)X_2 + N_1(1)$$

$$Y_1(2) = H_{1,2}(1)X_2 + N_1(2)$$

$$Y_1(3) = H_{1,1}(2)X_1 + N_1(3) \quad \text{[Equation 16]}$$

In this case, since a channel state of the first unit time of RX 1 is identical to a channel state of the second unit time of RX 1 (i.e., the first and second unit times of RX 1 have the same switching mode of 1), RX 1 may remove an interference signal from TX 2 by subtracting a receive (Rx) signal $Y_1(2)$ of the second unit time from a receive (Rx) signal $Y_1(1)$ of the first unit time. In addition, since a channel state of the first unit time of RX 2 is identical to a channel state of the third unit time of RX 2 (i.e., the first and third unit times of RX 2 have the same switching mode of 1), RX 2 may remove an interference signal from TX 1 by subtracting a receive (Rx) signal of the third unit time from the Rx signal of the first unit time.

Therefore, according to the above-mentioned method, an effective receive (Rx) signal of the i-th user can be represented by the following equation 17.

$$Y_1 = \begin{bmatrix} H_{1,1}(1) \\ H_{1,1}(2) \end{bmatrix} X_1 + \begin{bmatrix} N_1(1) - N_1(2) \\ N_1(3) \end{bmatrix}$$ [Equation 17]

Equation 17 exemplarily shows a reception (Rx) signal of the above-mentioned receiver (RX 1). This Rx signal may be modeled equivalent to the 4×4 MIMO channel. That is, RX 1 receives $X_1$ that has experienced different channels through antenna switching, such that RX 1 can receive a maximum of 4 streams. In accordance with the time-averaged result, each transmitter (TX) can transmit four streams during three symbols, and a maximum multiplexing gain per TX-RX pair is denoted by 4/3. When the receiver RX removes interference as described above, the receiver (RX) need not receive the channel estimation result or the channel information feedback from the interference transmitter (TX).

In this case, the transmit (Tx) signal may be precoded as denoted by $X_i=F_iS_i$. In this case, $F_i$ is an ($M \times d_i$) precoding matrix of the i-th transmitter (TX), and $S_i$ is a ($d_i \times 1$) transmit (Tx) symbol vector of the i-th TX. In this case, since MIMO channel information (specifically, a subband PMI) is not present in the transmitter (TX), $F_i$ may be a simple random unitary matrix, or may be a spatial correlation matrix of a channel. Alternatively, if a long term PMI (or a wideband PMI) or a subband PMI is fed back, $F_i$ may be a precoder using the corresponding PMI. The cases in which the number (M,N) of transmit/receive (Tx/Rx) antennas is applied to the present invention on the basis of the above-mentioned method are as follows.

The receiver (RX) must include N RF chains and N antennas must be reconfigured. The number of reconfigurable modes is denoted by 'm', and must be set to 2 or higher. In the above-mentioned case, m is set to 2 (m=2).

A channel of the receiver (RX) need not be changed when the antenna mode is switched.

The antenna mode switching operation of the receiver (RX) is one-to-one mapped to the transmit (Tx) symbol pattern.

A receive (Rx) signal of the i-th user is an equivalent M×2N MIMO channel, and the magnitude of $S_i$ must be denoted by min(M,2N) or less.

Precoding can be applied to the present invention.

The antenna mode switching period will hereinafter be described in detail. It is necessary for the receiver (RX) to recognize a channel during the antenna mode switching, so that the antenna switching must be carried out in consideration of a reference signal (RS) period for channel estimation. For example, in case of CRS, reference signals (RSs) for 4 antenna ports are transmitted in one subframe. In case of Demodulation Reference Signal (DMRS), reference signals (RSs) for 8 antenna ports can be transmitted.

The case of employing the CRS and the case of employing the DMRS will hereinafter be described in different ways.

1) The Case of Employing CRS

A maximum number of Tx symbols is denoted by (Number of receive (Rx) RF chains×Number of reconfigurable modes of each antenna). For example, when the UE has two RF chains and two reconfigurable modes are assigned to each of two antennas, all CRSs of four antenna ports can be used. In another example, assuming that the UE has a single RF chain and two reconfigurable modes for each antenna, CRSs of two antenna ports can be used. If necessary, CRSs of 4 antenna ports may also be used. The cases of employing the CRS can be classified into the following two methods according to the reference signal (RS) mapping method.

First, each reference signal (RS) may be mapped on the basis of a slot or subframe, and a detailed description thereof will hereinafter be described with reference to FIG. 11.

Figure 11:
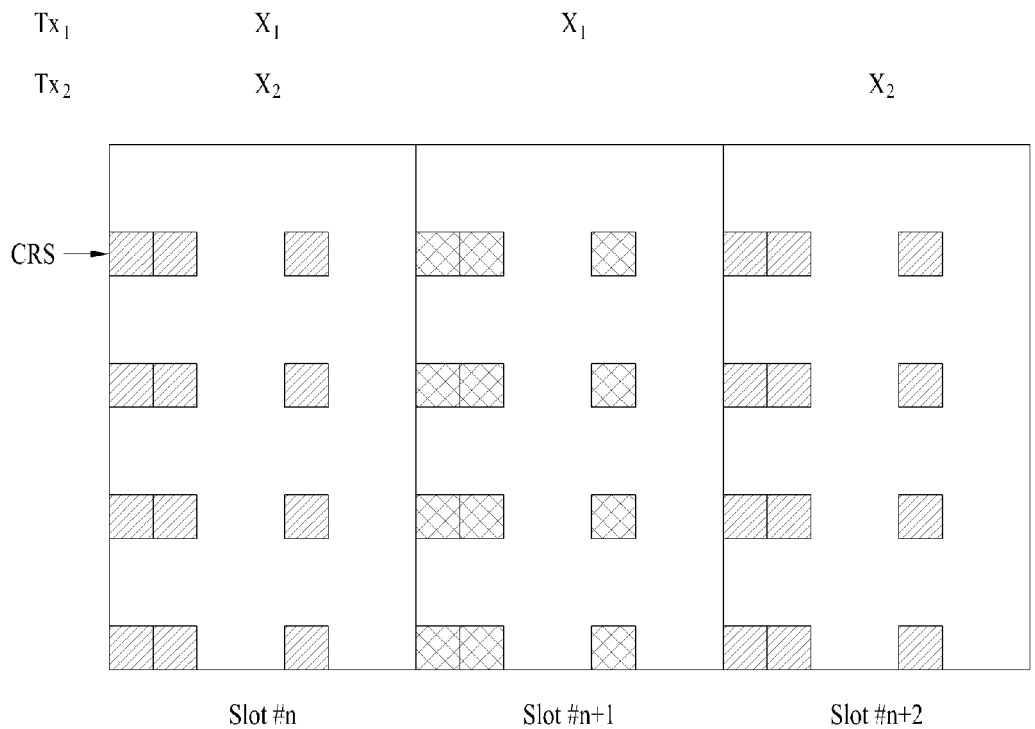
FIGS. 11 to 13 exemplarily show reference signal (RS) mapping patterns according to the embodiments of the present invention.

FIG. 11 exemplarily shows the RS mapping pattern according to one embodiment of the present invention. In FIG. 11, it is assumed that the BS has 4 transmit (Tx) antennas and the UE has two receive (Rx) antennas.

If the BS has 4 Tx antennas and the UE has two Rx antennas, the BS transmits data at Rank-4 and the UE switches 2 Tx antennas two times, so that the UE can receive and demodulate data. In this case, all channels must be estimated during the switching process, such that Rx antenna switching may be carried out on the basis of a slot or a subframe as shown in FIG. 11.

However, if Rx antenna switching occurs on a slot basis, the above-mentioned methods require 3 unit times (i.e., three slots), but one radio frame may not be divided by 3 without a remainder. In addition, even when the above switching action is performed on a subframe basis, the above-mentioned phenomenon may also occur. Therefore, the region that is not divided by 3 without the remainder may be used for other purposes or usages or may also be transmitted using the legacy MIMO scheme.

In order to avoid an odd number of subframes (or slots) generated when RS is mapped on a subframe basis, RS mapping may be carried out in units of an OFDM symbol, instead of in units of a subframe (or slot), and a detailed description thereof will hereinafter be described with reference to FIGS. 12 and 13.

Figure 12:
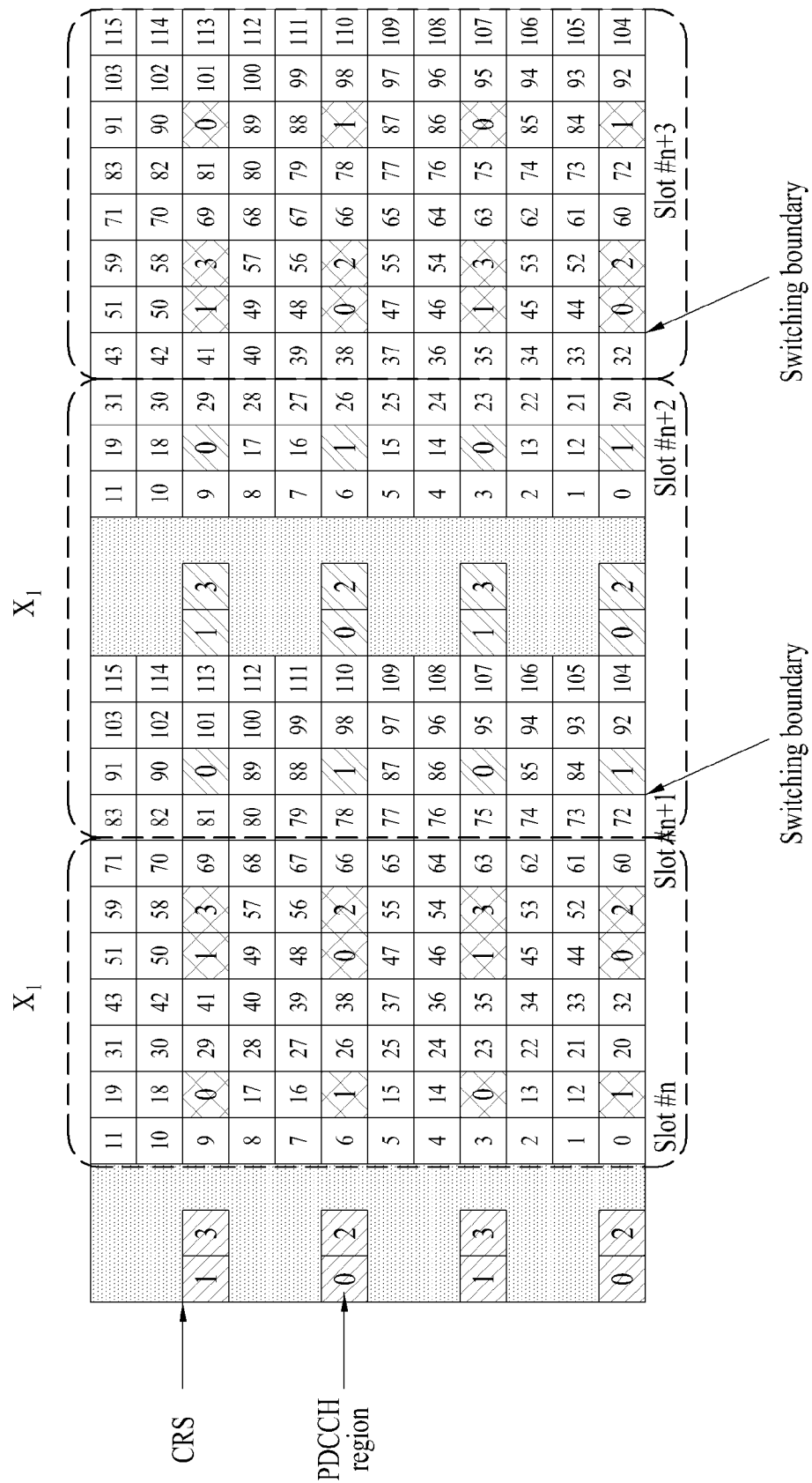
Figure 13:
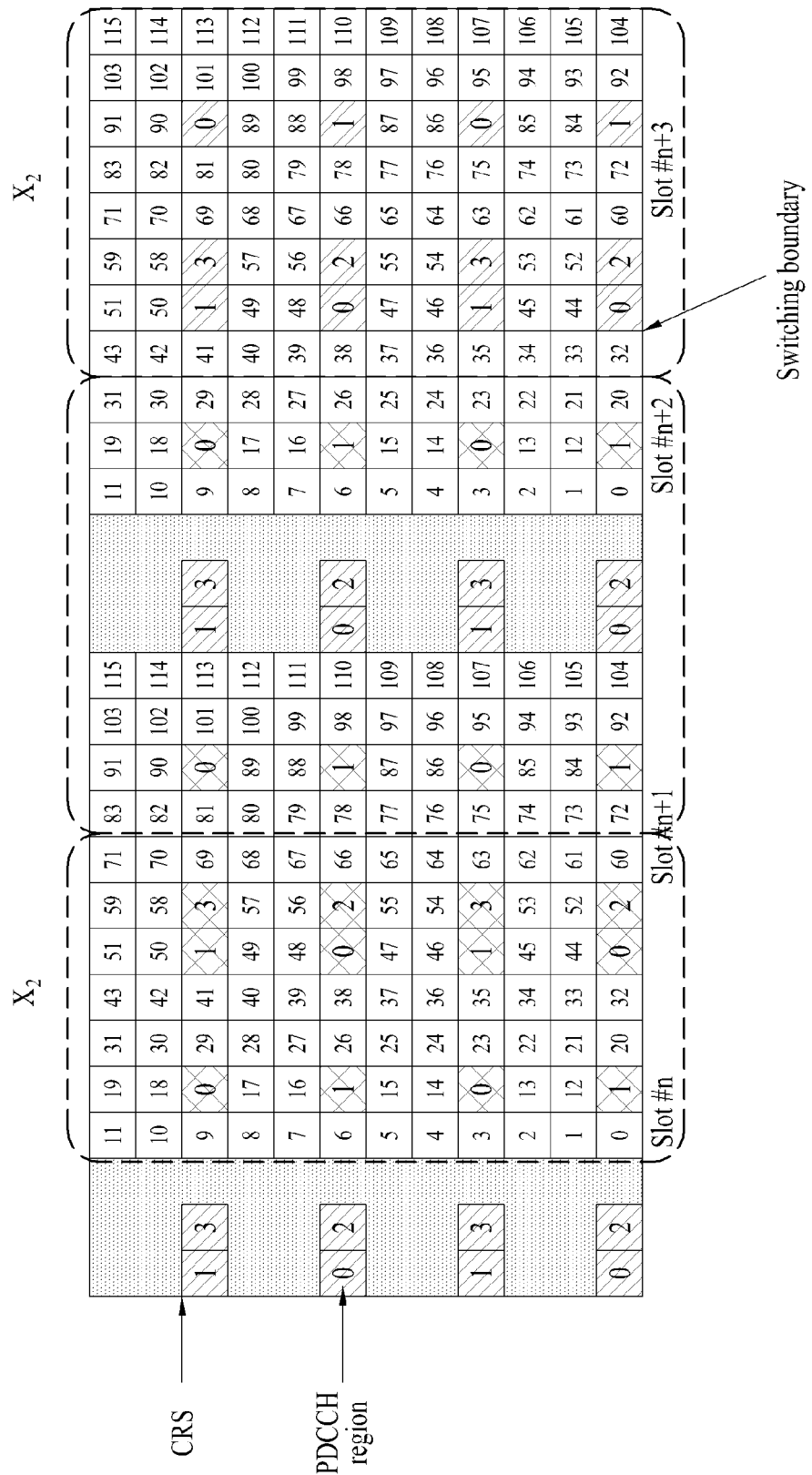

FIGS. 12 and 13 exemplarily show the reference signal (RS) mapping patterns according to the embodiments of the present invention. FIG. 12 exemplarily shows symbols transmitted from TX 1, and FIG. 13 exemplarily shows symbols transmitted from TX 2. IN addition, FIGS. 12 and 13 assume that the BS has 4 Tx antennas and the UE has two Rx antennas, and propose that blind coordinated BF is performed in units of 2 subframes at 4 antenna ports.

Referring to FIG. 12, if physical resource block (PRB) pairs are concatenated between subframes, and if the number of available resource elements (REs) in two PRB pairs is denoted by N, the available REs are maximally divided into three equal sections in units of OFDM symbols. That is, the remaining available REs other than RS and PDCCH in one resource block (RB) pair are numbered in a frequency direction, and are divided into three equal parts in units of an OFDM symbol. In the example of FIG. 12, assuming that a PDCCH of 3 symbols is present and both DMRS and CSI-RS are not present, 115 REs per PRB pair are made available. If the above-mentioned blind scheme is used by combining two subframes, REs need be trisected. In this case, the receiver (RX) performs antenna mode switching in units of an OFDM symbol, the number of REs is maximally divided into three equal parts in units of an OFDM symbol. Therefore, if a total of 230 REs are divided by an OFDM symbol unit, and if it is assumed that the antenna mode switching of the receiver (RX) is performed at each edge denoted by a dotted line, three regions include 71 REs, 74 REs, and 61 REs, respectively. In this case, a codeword mapped to one region must be mapped on the basis of the smallest number of REs from among the three regions.

Accordingly, the codeword mapped to one region is mapped using 61 REs only. The remaining region may not be used or may also be used to transmit other information as necessary. The reason why the codeword is mapped on the basis of the smallest RE from among three regions is that symbols applied to each region should be repeated in a manner that interference can be correctly cancelled by a simple minus calculation. RX may estimate the switched channel using RS present in each region, and the estimated channel is used for decoding. As described above, according to the method for mapping RSs in units of an OFDM symbol, two subframes may be considered one blind codeword differently from the legacy method in which RS is mapped in units of a slot or subframe, so that odd subframes or odd slots may not remain in the case of using the above method for mapping RSs in units of an OFDM symbol. In addition, if scheduling is achieved on the basis of two subframes, PDCCH (EPDCCH) may be omitted from the second PRB pair. Accordingly, since a control channel from among two subframes is transmitted only once, PDCCH/EPDCCH are transmitted once every two subframes, so that the number of available REs can be increased. In this case, a predetermined rule between the BS and the UE can be decided in a manner that PDCCH not transmitted at the second subframe satisfies PDCCH information (e.g., resource allocation, MCS, etc.) transmitted from a first subframe.

2) Case of Using DMRS

DMRS can be configured in the range of a maximum of 8 antenna ports. Therefore, although the number of actual antenna ports within on PRB pair is 4, 8 DMRS antenna ports are configured so that blind coordinated BF can be applied to the 8 DMRS antenna ports. For example, DMRS antenna ports #7, #8, #9, and #10 may be used to estimate a channel of the antenna mode #1 in which RX can be reconfigured, and antenna ports #11, #12, #13, and #14 may be used to estimate a channel of the antenna mode #2. In this way, when 8 antenna ports are configured and antenna of the actual four antenna ports are present, the precoder for use in DMRS antenna ports #7, #8, #9, and #10 must be identical to the precoder for use in DMRS antenna ports #11, #12, #13, and #14. In addition, the actual physical antennas mapped to DMRS antenna ports must be identical to antenna ports #7, #8, #9, and #10 and antenna ports #11, #12, #13, and #14. If Rx antenna mode switching is performed in one PRB pair, the switching edge is similar to those of the OFDM-based CRS mapping schemes (See FIGS. 12 and 13). Since RX performs antenna mode switching in units of an OFDM symbol, the number of REs on the basis of an OFDM symbol is maximally divided into three equal parts. As described above, the codeword mapped to one region must be mapped on the basis of the smallest number of REs of three regions. Therefore, the remaining regions other than the smallest REs may not be used or may also be used to transmit other information as necessary. The reason why codeword mapping is performed on the basis of the smallest RE from among three regions is that symbols applied to each region should be repeated in a manner that interference can be correctly cancelled by a simple minus calculation. In this case, since scheduling can be achieved in units of a subframe, this scheduling is not greatly different from the legacy scheduling.

As described above, even in the case of using DMRS, if only 4 antenna ports are configured, blind coordinated BF can be applied in units of 2 subframes in the same manner as in CRS.

Meanwhile, even in the case of using two Tx antennas, 4 antenna ports are virtually configured in a similar way to the case of using DMRS and 2 antenna ports may be configured to estimate a channel of other antenna modes of the receiver (RX). In accordance with the codeword mapping method, codewords can be maximally divided into three equal parts on the basis of an OFDM symbol in the same manner as in the above-mentioned method.

In accordance with the present invention, although coordinated beamforming between the BSs is performed, the UE need not estimate a channel from the contiguous cell. Therefore, the BSs need not share RS information of the contiguous BS through a backhaul link. Transmit (Tx) symbol patterns must be shared by the BSs, and this patterns must be signaled to the UE.

Therefore, the BS must inform a specific UE of the Tx symbol patterns such that the present invention can be applied to a general cellular environment. The present invention proposes the following two schemes.

First, the BSs participating in the blind coordinated BF must use different code patterns (i.e., Tx symbol patterns), and these code patterns may be implicitly decided by the cell ID. In this case, the cell ID must be allocated in a manner that the cells do not use the same code patterns. For example, if the remainder of the resultant value obtained when the modulo-2 operation is applied to the cell ID is set to 1, the code pattern 1 (X1, X1, null) may be used. If the remainder is set to zero 0, the code pattern 2 (X2, null, X2) may be used. However, the above-mentioned scheme has a disadvantage in that it is impossible to apply blind coordinated beamforming to a specific cell ID between the BSs. If blind coordinated beamforming is indicated through a cell ID of the UE, the antenna switching pattern may be decided through the code pattern. In this case, the BS must inform a scheduled UE of the following information. Information as to whether blind coordinated beamforming is performed, a time unit (e.g., 1-subframe basis, 2-subframe basis, or 1-slot basis) scheduled by blind coordinated beamforming, and configured antenna port information may be signaled to the UE. In this case, the subframe (or slot) unit for scheduling of the blind coordinated beamforming can be achieved only when two BSs for performing blind coordinated beamforming are identical to each other. In addition, if as many as two times the number of actual Tx antennas are virtually configured, this configuration information must be signaled to the UE. The above-mentioned information may be signaled to the UE through higher physical layer signaling or higher layer signaling. For example, the above information may be signaled to the UE using a Transmit Power Control (TPC) field of PDCCH/EPDCCH or other idle fields.

In addition, a code pattern to be used between the BSs is decided, and the decided code pattern is shared through a backhaul link, and the code pattern information may be signaled to the UE. In this case, the code pattern information may be signaled to the UE during long term without problems, such that this code pattern information may be signaled to the UE through RRC signaling. The above-mentioned scheme has an advantage in that blind coordinated beamforming can also be applied to the BSs of a certain combination unlike the above-mentioned implicit decision scheme.

The scope or spirit of the present invention is not limited only to a downlink system. In case of uplink, the BS has many more antennas than the UE, and a beam pattern of the BS is changed, resulting in the reconfigurable antenna effect. In case of using the Joint Reception (JR) scheme in the legacy uplink CoMP, a UE ID of a contiguous-cell user is shared through a backhaul link, and channel estimation must be performed using a reference signal of the contiguous-cell user, and decoding must then be carried out. However, in case of using the blind coordinated beamforming scheme, UE ID of the contiguous-cell user need not be shared and the channel estimation process need not be used. A UE of each cell transmits a blind codeword on uplink, and the BS changes a beam pattern in response to the codeword, resulting in interference cancellation.

Meanwhile, the scope or spirit of the present invention is not limited to two cells, and three or more cells can support blind coordinated beamforming. The case in which three cells support blind coordinated beamforming will hereinafter be described with reference to FIGS. 14 and 15.

If three cells support blind coordinated beamforming, the antenna mode switching patterns of respective receivers (RXs) and the transmit (Tx) symbol formats of respective transmitters (TXs) are shown in FIGS. 14 and 15.

In FIG. 14, it is assumed that the number (M) of Tx antennas for use in three cells is double that of the number (N) of Rx antennas (i.e., M=4N) (e.g., M=8, N=4 or M=4, N=2, or M=2, N=1, etc.), each RX has N reconfigurable antennas, and the number of preset modes per antenna is set to 2. In contrast, in FIG. 15, it is assumed that the number (M) of Tx antennas for use in three cells is four times the number (N) of Rx antennas (i.e., M=4N) (e.g., M=8, N=2 or M=4, N=1, etc.), each RX has N reconfigurable antennas, and the number of preset modes per antenna is set to 4.

Referring to FIGS. 14 and 15, numerals of the switching patterns may denote the antenna modes. In this case, a transmit (Tx) symbol $X_i$ of each UE is an (M×1)-sized Tx symbol vector. If the number of data symbols of the Tx symbol vector is higher than the number of Rx antennas, and if a desired signal to be received through antenna switching is repeatedly received, the receiver (RX) can perform decoding. In this case, interference may be present. If the proposed symbol pattern is transmitted, an interference signal may be cancelled by a simple minus calculation. In this case, it is not necessary to receive the channel estimation result or the channel information feedback result from the interference TX in the same manner as in two cells.

General Apparatus Applicable to the Present Invention

Figure 16:
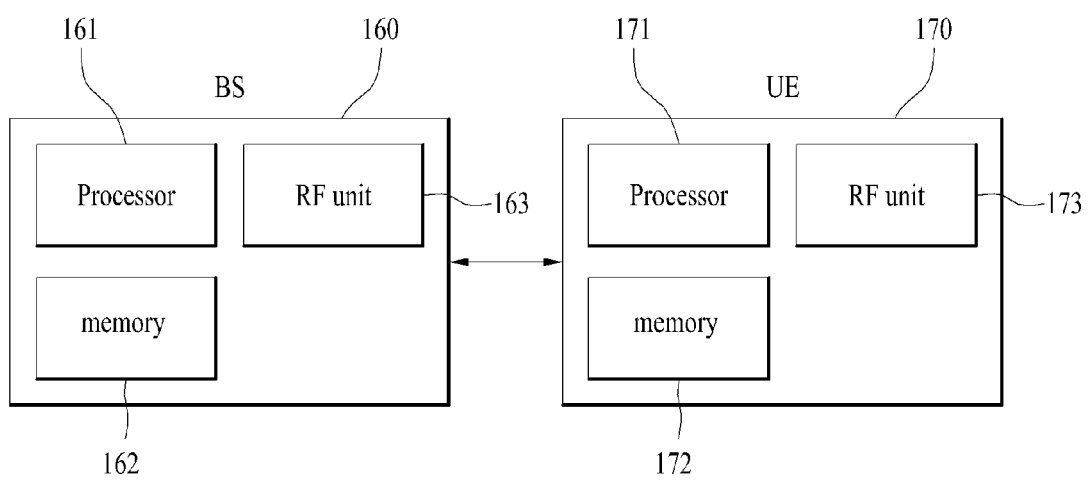
FIG. 16 is a block diagram illustrating a wireless communication apparatus applicable to embodiments of the present invention.

FIG. 16 is a block diagram illustrating a wireless communication apparatus according to an embodiment of the present invention.

Referring to FIG. 16, the wireless communication system includes a base station (BS) 160 and a plurality of UEs 170 located in the BS region 160.

The BS 160 includes a processor 161, a memory 162, and a radio frequency (RF) unit 163. The processor 161 may be constructed to implement the procedures and/or methods disclosed in the embodiments of the present invention. Layers of the radio interface protocol may be implemented by the processor 161. The memory 162 may be connected to the processor 161, and store various information related to operations of the processor 161. The RF unit 163 is connected to the processor 161, and transmits and/or receives RF signals.

The UE 170 includes a processor 171, a memory 172, and an RF unit 173. The processor 171 may be constructed to implement the procedures and/or methods disclosed in the embodiments of the present invention. Layers of the radio interface protocol may be implemented by the processor 171. The memory 172 may be connected to the processor 171, and store various information related to operations of the processor 171. The RF unit 173 is connected to the processor 171, and transmits and/or receives RF signals.

The memory 162 or 172 may be located inside or outside the processor 161 or 171, and may be connected to the processor 161 or 171 through various well known means. In addition, the BS 170 and/or the UE 170 may have a single antenna or multiple antennas. Specifically, the UE 170 of the present invention may include reconfigurable antennas shown in FIG. 9.

The embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary. Also, it will be obvious to those skilled in the art that claims that are not explicitly cited in the appended claims may be presented in combination as an exemplary embodiment of the present invention or included as a new claim by subsequent amendment after the application is filed.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided by a rational analysis of the claims, and all modifications within equivalent ranges of the present invention are within the scope of the present invention.

INDUSTRIAL APPLICABILITY

As is apparent from the above description, although various embodiments of the present invention have been disclosed on the basis of application to 3GPP LTE, the inventive concept of the present invention is applicable not only to 3GPP LTE, but also to other mobile communication systems.

The invention claimed is:

1. A method for supporting, by a user equipment (UE), coordinated beamforming between base stations (BSs) in a wireless access system, comprising:

receiving information of a time unit for scheduling the coordinated beamforming from a BS, wherein a period of the coordinated beamforming is two consecutive subframes;

receiving a downlink signal having a predetermined transmission pattern per the time unit for scheduling the coordinated beamforming from the BS;

demodulating the downlink signal using a reference signal (RS), which is mapped per the time unit for scheduling the coordinated beamforming, transmitted from the BS; and cancelling an interference signal transmitted from a contiguous BS using the same downlink signal received from different antenna modes from among the received downlink signals, wherein the antenna modes of the UE are switched per the time unit for scheduling the coordinated beamforming, wherein the time unit for scheduling the coordinated beamforming is determined by dividing the number of available resource elements (REs), located in the two consecutive subframes, into an odd number of sections, and wherein the available REs are a plurality of REs other than a plurality of RSs and a plurality of physical downlink control channels (PDCCHs) in the two consecutive subframes.

2. The method according to claim 1, wherein the time unit for scheduling the coordinated beamforming is determined by dividing the number of available resource elements (REs) into three equal sections.

3. The method according to claim 1, wherein the transmission pattern of the downlink signal is comprised of different patterns between contiguous BSs.

4. The method according to claim 1, wherein one or more PDCCH is omitted from a second subframe among the two consecutive subframes.

5. The method according to claim 1, further comprising: receiving information regarding the transmission pattern from the BS.

6. The method according to claim 1, wherein the RS is a common reference signal (CRS) or a demodulation reference signal (DMRS).

7. A user equipment (UE) device for supporting coordinated beamforming between base stations (BSs) in a wireless access system comprising:

a transceiver; and a processor, operatively connected to the transceiver, that:

controls the transceiver to receive information of a time unit for scheduling the coordinated beamforming from a BS, wherein a period of the coordinated beamforming is two consecutive subframes, controls the transceiver to receive a downlink signal having a predetermined transmission pattern per the time unit for scheduling the coordinated beamforming from the BS, demodulates the downlink signal using a reference signal (RS), which is mapped per the time unit for scheduling the coordinated beamforming, transmitted from the BS, and cancels interference signal transmitted from a contiguous BS using the same downlink signal received from different antenna modes from among the received downlink signals, wherein the antenna modes of the transceiver are switched per the time unit for scheduling the coordinated beamforming, wherein the time unit for scheduling the coordinated beamforming is determined by dividing the number of available resource elements (REs) in the two consecutive subframes into an odd number of sections, and wherein the available REs are a plurality of REs other than a plurality of RSs and a plurality of physical downlink control channels (PDCCHs) in the two consecutive subframes.

8. The user equipment (UE) device according to claim 7, wherein the time unit for scheduling the coordinated beamforming is determined by dividing the number of available resource elements (REs) into three equal sections.

9. The user equipment (UE) device according to claim 7, wherein the transmission pattern of the downlink signal is comprised of different patterns between contiguous BSs.

10. The user equipment (UE) device according to claim 7, wherein one or more PDCCH is omitted from a second subframe among the two consecutive subframes.

11. The user equipment (UE) device according to claim 7, wherein the processor is further configured to receive information regarding the transmission pattern from the BS.

12. The user equipment (UE) device according to claim 7, wherein the RS is a common reference signal (CRS) or a demodulation reference signal (DMRS).

* * * * *